(12) United States Patent
Smolinski et al.

(10) Patent No.: US 9,317,125 B2
(45) Date of Patent: Apr. 19, 2016

(54) SEARCHING OF LINE PATTERN REPRESENTATIONS USING GESTURES

(71) Applicant: Microsoft Technology Licensing, LLC, Redmond, WA (US)

(72) Inventors: Adam Smolinski, North Bend, WA (US); Michael John Ebstyne, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 13/869,771

(22) Filed: Apr. 24, 2013

(65) Prior Publication Data

US 2014/0325457 A1 Oct. 30, 2014

(51) Int. Cl.
*G06F 3/033* (2013.01)
*G06K 9/00* (2006.01)
*G06K 9/62* (2006.01)
*G06F 3/01* (2006.01)
*G06F 3/0488* (2013.01)

(52) U.S. Cl.
CPC ............ *G06F 3/017* (2013.01); *G06F 3/04883* (2013.01); *G06K 9/00335* (2013.01)

(58) Field of Classification Search
None
See application file for complete search history.

(56) References Cited

U.S. PATENT DOCUMENTS

| | | | |
|---|---|---|---|
| 4,542,526 A | 9/1985 | Satoh et al. | |
| 5,204,915 A | 4/1993 | Nishida | |
| 5,428,692 A * | 6/1995 | Kuehl | 382/204 |
| 5,640,607 A * | 6/1997 | Murray | 710/68 |
| 6,141,454 A | 10/2000 | Seymour et al. | |
| 6,628,279 B1 | 9/2003 | Schell et al. | |
| 7,137,076 B2 * | 11/2006 | Iwema | G06K 9/00436 345/179 |
| 7,242,805 B1 | 7/2007 | Reihani | |
| 7,557,803 B2 | 7/2009 | Furukawa et al. | |
| 7,630,962 B2 * | 12/2009 | Napper et al. | |
| 8,094,920 B2 * | 1/2012 | Sugiyama et al. | 382/141 |
| 8,179,604 B1 * | 5/2012 | Prada Gomez et al. | 359/630 |
| 8,514,178 B2 * | 8/2013 | Song et al. | 345/168 |

(Continued)

FOREIGN PATENT DOCUMENTS

EP 1229488 A2 8/2002

OTHER PUBLICATIONS

Utsumi et al. "Direct Manipulation Interface using Multiple Cameras for Hand Gesture Recognition" Multimedia Computing and Systems, IEEE Conference Proceedings (Jun. 1998) pp. 264-267 (pp. 1-4).*

(Continued)

*Primary Examiner* — Chan Park
*Assistant Examiner* — Mia M Thomas
(74) *Attorney, Agent, or Firm* — Kate Drakos; Fehmi Chebil; Micky Minhas

(57) ABSTRACT

The gesture-based searching of a line pattern representation amongst a collection of line pattern representations. Upon detecting an input gesture, a computing system matches the input gesture against each of multiple pattern representations. Each line pattern representation represents a line pattern having a changing value in a first dimension as a function of a value in a second dimension. At least some of the matched set may then be visualized to the user. The input gesture may be a literal line pattern to match against, or might be a gesture that has semantic meaning that describes search parameters of a line pattern to search for. The matched set may be presented so that a display parameter conveys a closeness of the match.

20 Claims, 6 Drawing Sheets

(56) References Cited

U.S. PATENT DOCUMENTS

| | | | | |
|---|---|---|---|---|
| 8,515,153 | B2* | 8/2013 | Sugiyama et al. | 382/141 |
| 9,189,825 | B2* | 11/2015 | Im | G06T 1/0007 |
| 2002/0075286 | A1* | 6/2002 | Yonezawa | G02B 27/017 |
| | | | | 345/679 |
| 2002/0128796 | A1 | 9/2002 | Matsutani | |
| 2003/0185445 | A1* | 10/2003 | Chang et al. | 382/203 |
| 2005/0271252 | A1* | 12/2005 | Yamada | 382/103 |
| 2005/0275622 | A1* | 12/2005 | Patel et al. | 345/156 |
| 2006/0007188 | A1* | 1/2006 | Reiner | 345/179 |
| 2006/0010141 | A1 | 1/2006 | Furukawa et al. | |
| 2006/0013483 | A1* | 1/2006 | Kurzweil et al. | 382/176 |
| 2007/0098289 | A1 | 5/2007 | Kondo et al. | |
| 2007/0173240 | A1 | 7/2007 | Lim | |
| 2008/0013793 | A1* | 1/2008 | Hillis et al. | 382/114 |
| 2008/0091713 | A1* | 4/2008 | Candelore | H04N 7/163 |
| 2008/0170776 | A1* | 7/2008 | Albertson et al. | 382/154 |
| 2008/0304721 | A1* | 12/2008 | Wu et al. | 382/128 |
| 2009/0324076 | A1* | 12/2009 | Kolmykov-Zotov | G06K 9/00409 |
| | | | | 382/170 |
| 2010/0104134 | A1* | 4/2010 | Wang et al. | 382/103 |
| 2010/0278453 | A1* | 11/2010 | King | G06Q 10/10 |
| | | | | 382/321 |
| 2010/0328201 | A1* | 12/2010 | Marvit et al. | 345/156 |
| 2011/0252381 | A1* | 10/2011 | Chaudhri | 715/838 |
| 2012/0069027 | A1 | 3/2012 | Yamazaki et al. | |
| 2012/0131520 | A1* | 5/2012 | Tang | G06F 3/04883 |
| | | | | 715/863 |
| 2012/0144335 | A1* | 6/2012 | Abeln | G06Q 10/06 |
| | | | | 715/771 |
| 2012/0197857 | A1* | 8/2012 | Huang et al. | 707/706 |
| 2012/0229468 | A1* | 9/2012 | Lee et al. | 345/440 |
| 2012/0256926 | A1* | 10/2012 | Jimenez et al. | 345/440 |
| 2014/0211991 | A1* | 7/2014 | Stoppa | G06K 9/00355 |
| | | | | 382/103 |

OTHER PUBLICATIONS

Tirkaz, et al. "Sketched symbol recognition with auto-completion" Pattern Recognition 45 (May 2012) 3926-3937.*

Rubine, Dean. "Specifying Gestures by Example" Computer Graphics, vol. 25, No. 4, Jul. 1991.*

International Search Report & Written Opinion for PCT Patent Application No. PCT/US2014/034848, Mailed Date: Jul. 24, 2014, Filed Date: Apr. 22, 2014, 10 Pages.

Keogh, et al., "Relevance Feedback Retrieval of Time Series Data", in Proceedings of the 22nd Annual International ACM SIGIR Conference on Research and Development in Information Retrieval, Aug. 1, 1999, pp. 183-190.

Ryall, et al., "QueryLines: Approximate Query for Visual Browsing" In Proceedings of Extended Abstracts on Human Factors in Computing Systems, Apr. 2, 2005, pp. 1765-1768.

Wattenberg, Martin, "Sketching a Graph to Query a Time-Series Database", In Proceedings of Extended Abstracts on Human Factors in Computing Systems, Mar. 31, 2001, pp. 381-382.

Tirkaz, et al., "Sketched Symbol Recognition with Auto-Completion", In Journal Pattern Recognition, A Elsevier Science Inc. Publication, vol. 45, Issue 11, Apr. 25, 2012, pp. 3926-3937.

U.S. Appl. No. 13/869,816, filed Apr. 24, 2013, Smolinski et al.

U.S. Appl. No. 13/869,835, filed Apr. 24, 2013, Smolinski et al.

"International Search Report & Written Opinion for PCT Patent Application No. PCT/US2014/034850", Mailed Date: Jul. 18, 2014, Filed Date: Apr. 22, 2014, 12 Pages.

"Adobe Photoshop Help and Tutorials", Adobe, Feb. 1, 2013, pp. 226-228.

International Search Report & Written Opinion for PCT Patent Application No. PCT/US2014/034849, Mailed Date: Jul. 17, 2014, Filed Date: Apr. 22, 2014, 10 pages.

Office Action dated Sep. 23, 2015 cited in U.S. Appl. No. 13/869,816.

Notice of Allowance dated Oct. 5, 2015 cited in U.S. Appl. No. 13/869,835.

Walny, et al., "Understanding Pen and Touch Interaction for Data Exploration on Interactive Whiteboards", In IEEE Transactions on Visualization and Computer Graphics, Dec. 2012, 10 pages.

Idreos, et al., "dbTouch: Analytics at your Fingertips", In Proceedings of 6th Biennial Conference on Innovative Data Systems Research, Jan. 6, 2013, 11 pages.

Holz, et al., "Relaxed Selection Techniques for Querying Time-Series Graphs", In Proceedings of the 22nd Annual ACM Symposium on User Interface Software and Technology, Oct. 4, 2009, 10 pages.

International Preliminary Report on Patentability Issued in PCT Application No. PCT/US2014/034848, Mailed Date: Aug. 14, 2015, 9 Pages.

Office Action dated Nov. 30, 2015 cited in U.S. Appl. No. 13/869,816.

* cited by examiner

SEARCHING OF LINE PATTERN REPRESENTATIONS USING GESTURES

BACKGROUND

The information age is characterized by the widespread availability of information made possible through network communication. However, the mass of available information often makes it difficult to extract data of interest. Because of the potentially laborious nature of extracting valuable data from large amounts of less valuable information, the labor is often referred to as "data mining". Less valuable or irrelevant information is analogous to raw earth that must be sifted through in order to find valuable minerals, which are analogous to relevant information.

One way to extract information is to submit queries on databases. This method lends itself well to data that has identified properties that are monitored by the database. However, there is a wide variety of ways in which data can be stored. Some types of data, such as time series charts, are not quite as easy to sift through as they can often represent complex line representations that do not lend themselves well subject to database queries.

BRIEF SUMMARY

At least some embodiments described herein relate to the searching of a line pattern representation amongst a collection of line pattern representations using gestures. Upon detecting an input gesture, a computing system matches the input gesture against each of multiple pattern representations. Each line pattern representation represents a line pattern having a changing value in a first dimension as a function of a value in a second dimension. At least some of the matched set may then be visualized to the user. The input gesture may be a literal line pattern to match against, or might be a gesture that has semantic meaning that describes search parameters of a line pattern to search for. The matched set may be presented so that a display parameter conveys a closeness of the match.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the searching of a line pattern representation amongst a collection of line pattern representations. Upon detecting an input gesture, a computing system matches the input gesture against each of multiple pattern representations. Each line pattern representation represents a line pattern having a changing value in a first dimension as a function of a value in a second dimension. At least some of the matched set may then be visualized to the user. The input gesture may be a literal line pattern to match against, or might be a gesture that has semantic meaning that describes search parameters of a line pattern to search for. The matched set may be presented so that a display parameter conveys a closeness of the match. Some introductory discussion of a computing system will be described with respect to FIG. 1. Then, the searching for line pattern representations using input gestures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
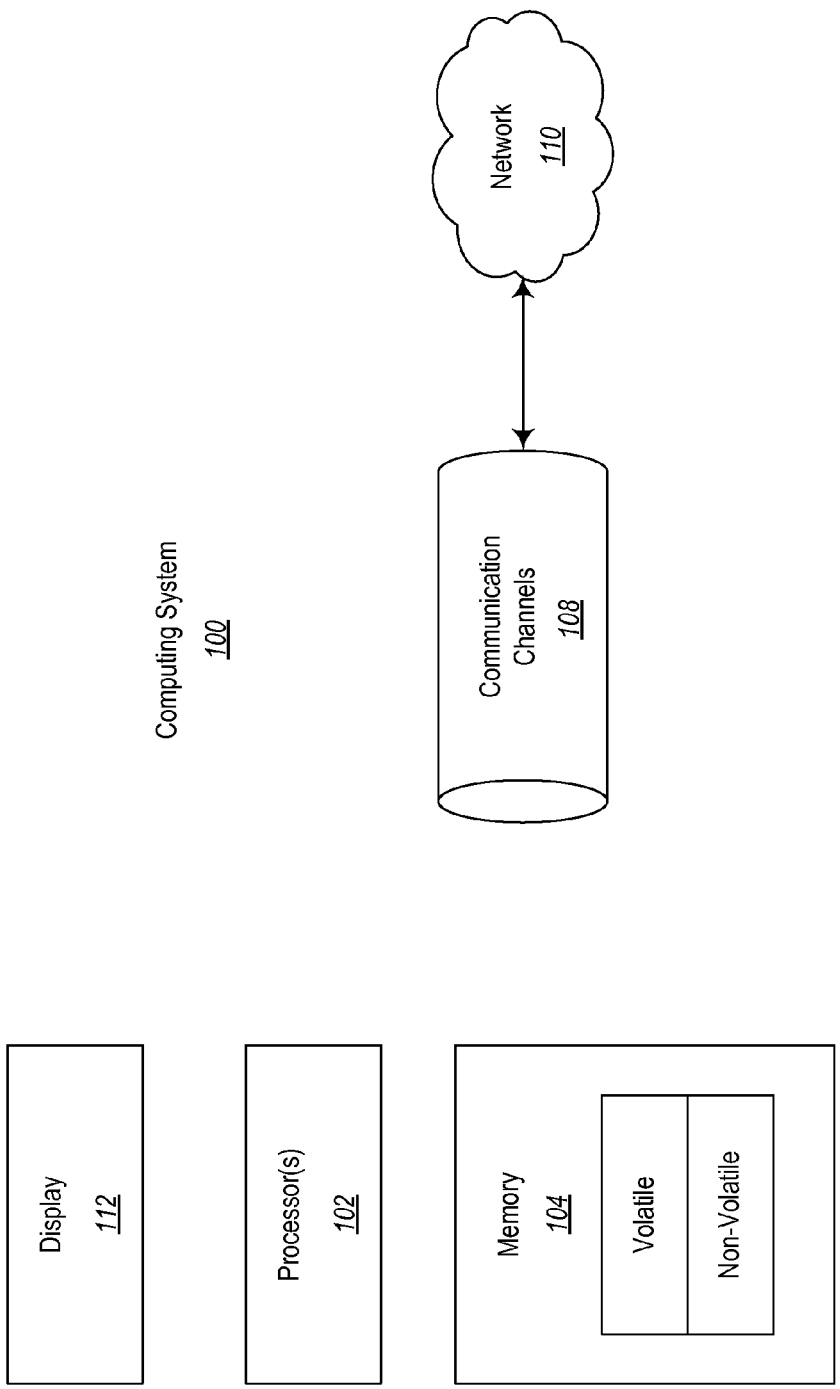
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
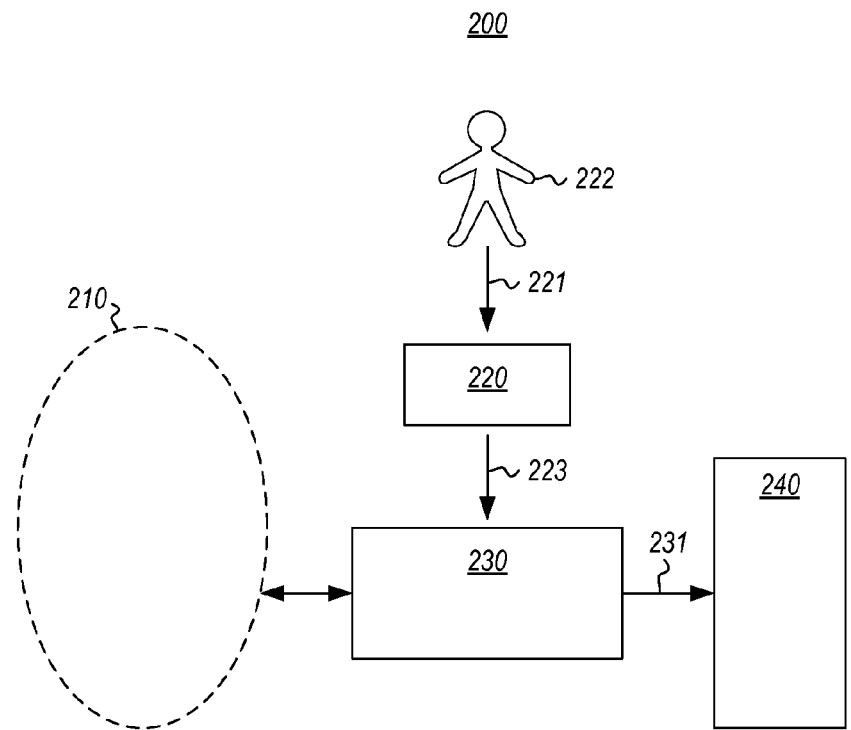
FIG. 2 illustrates a system in which an input gesture is used to search against a collection of line pattern representations.

FIG. 2 illustrates a system 200 that includes a collection 210 of line pattern representations. This collection 210 may include many line pattern representations, even perhaps millions or billions. However, the principles described herein are not limited to the number of line pattern representations in the collection being searched. In accordance with one encoding technique described hereinafter, the line pattern representations may be searched quite efficiently, allowing for more effective and real-time searching of large quantities of line pattern representations. Each line pattern representation represents a line pattern having a changing value in a first dimension (e.g., the vertical dimension—sometimes referred to as the "y-axis") as a function of a value in a second dimension (e.g., the horizontal dimension—sometimes referred to as the "x-axis").

An input mechanism 220 is configured to detect user input 221. For instance, the user input 221 might be a gesture that is to be used to express parameters of a line pattern representation being searched for. A matching mechanism 230 matches the computer representation 223 of the input gesture 221 against each of the line pattern representations in the collection 210.

For instance, the input gesture may be a literal input line pattern that represents the line pattern being searched for. In that case, the matching mechanism finds those line patterns representations that most closely match the input line pattern. This type of gesture will be referred to herein as a "literal gesture".

The input gesture might alternatively express some semantic meaning regarding search parameters. This type of gesture will be referred to herein as a "semantic gesture". For instance, certain gestures could express a rate of change, a direction of change, a volatility, a peak or bottom location, a general shape, or so forth, of the line pattern being searched for.

As an example, a quickly drawn line having a particular slope might express that a line pattern is being searched for that has a generate rate of change with respect to the vertical axis that is approximately proportional to the slope of the quickly drawn line. A quickly drawn zigzag might indicate that line pattern representations are being sought that have a vertical volatility approximately proportional to the magnitude of the zigzag line. Other appropriate semantic gestures could be used to search on other parameters.

The semantic meaning of the gesture might also be with respect to another input line pattern representation. For instance, the user might enter a literal gesture to provide an input line pattern representation, and then issue a semantic gesture indicating that the line pattern being searched for will have a certain relationship with the input line pattern representation. For instance, the relationship might be that the input line pattern would intersect or cross-over the line pattern being searched for. As another example, the relationship might be that the line pattern being searched for might be a horizontally and/or vertically mirrored version of the input line pattern representation.

The search interface may have a control for switching between literal and semantic gesturing. Alternatively or in addition, the searching interface may make its own automated determination of whether literal or semantic gesturing is intended. Such automated determination might be made based on context of the searching application, the identity of the user, and nature of the gesture, and so forth.

A visualization component 240 visualizes at least some of the matched set 231 of line pattern representations identified by the matching mechanism 230. In one embodiment, only the most closely matched line pattern representations are visualized. In other embodiments, more than just the most closely matched line pattern representations are visualized. The closeness of the match might be visually emphasized using a display parameter. For instance, the display parameter might be a darkness or lightness, such that a level of lightness represented a closeness of the match. The display parameter might be a size such that more closely matched line representations are larger in size. The display parameter might also be a position such that more closely matched line pattern representations are more prominently positioned.

Figure 3:
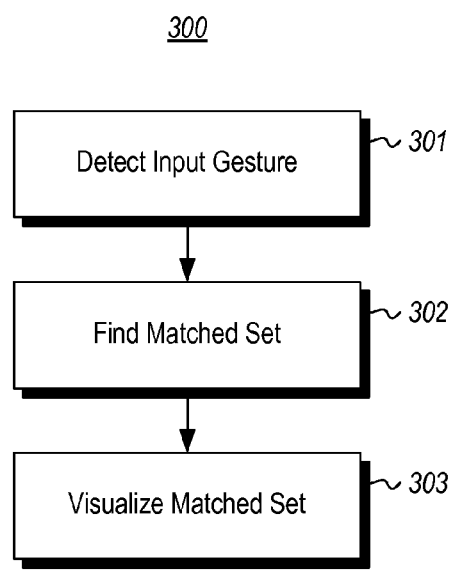
FIG. 3 illustrates a flowchart of a method for searching a line pattern representation amongst a collection of line pattern representations.

FIG. 3 illustrates a flowchart of a method 300 for searching a line pattern representation amongst a collection of line pattern representations. The method 300 may be performed by the system 200 of FIG. 2, and thus will be described with frequent reference to FIG. 2.

An input gesture is detected as input by a user into a computing system act 301). For instance, in FIG. 2, the user 222 inputs a gesture 221 into the input mechanism 220. The input mechanism 220 then provides an electronic form 223 of the input gesture to the matching mechanism 230.

The input gesture is then automatically matched against each of the collection of line pattern representations (act 302). For instance, the matching mechanism 230 matches the input gesture 223 against each of the line pattern representations in the collection 210.

The matching one or more line pattern representations are then visualized (act 303). For instance, the visualization component 240 receives the matched set identification as represented by arrow 331, and visualizes the result on a display, such as display 112 of FIG. 1.

In some embodiments, this matching operation might be efficiently performed by performing the encoding process described with respect to FIGS. 4 through 7. The encoding process may be performed on the entirety of each of the line pattern representations in the collection in advance of the user entering the input partial line pattern. Thus, associated with each of the line pattern representations is the associated encoding resulting from FIGS. 4 through 7.

Figure 4:
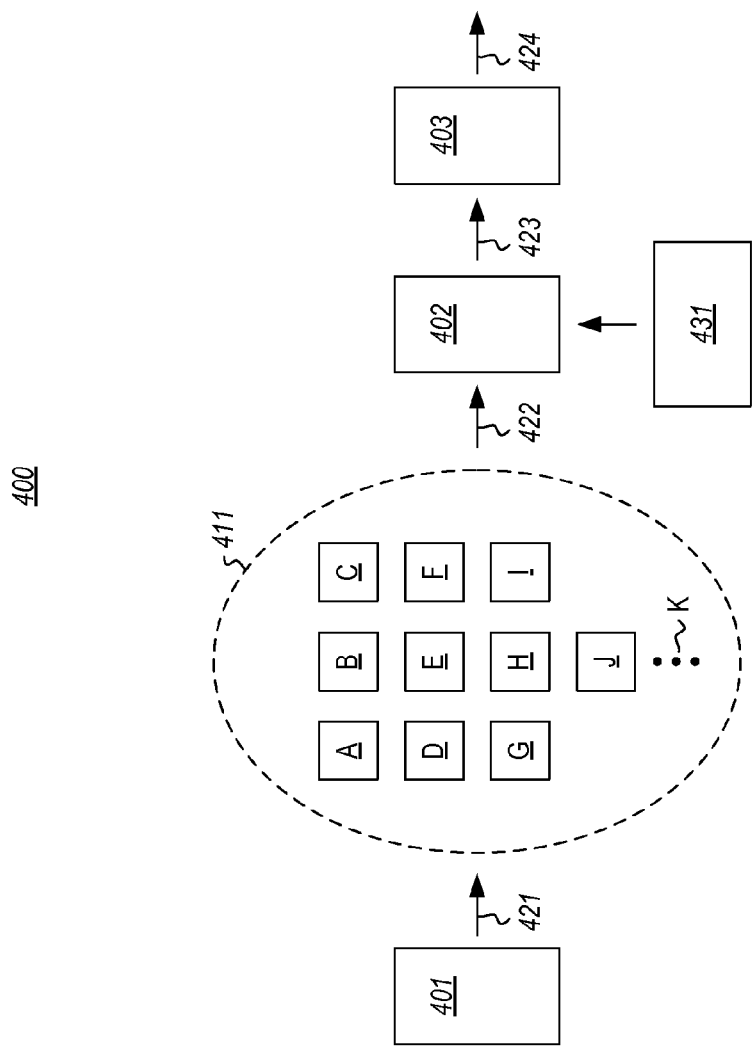
FIG. 4 illustrates a system that encodes each of multiple line pattern representations.
Figure 5:
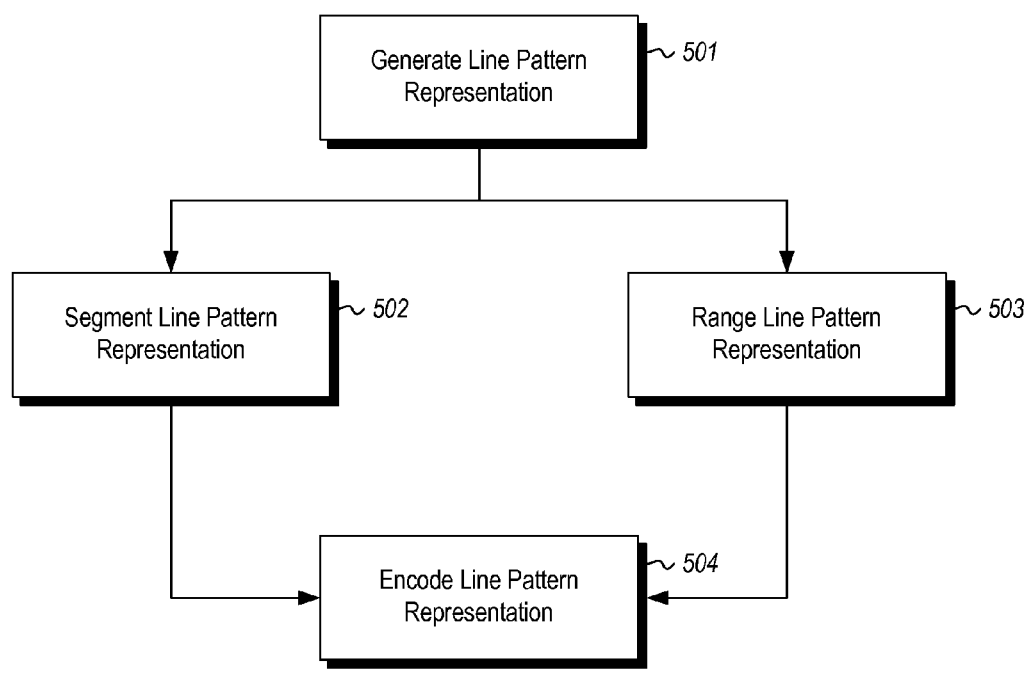
FIG. 5 illustrates a flowchart of a method for encoding line pattern representations.

FIG. 4 illustrates a system 400 that encodes each of multiple line pattern representations. FIG. 5 illustrates a flowchart of a method 500 for encoding line pattern representations. As the method 500 of FIG. 5 may be performed by the system 400 of FIG. 4, the description of FIGS. 4 and 5 will now proceed in an intermingled fashion. The method 500 may be performed for each of line pattern representations in the collection.

The system 400 includes a pattern generation component 401, which generates one or more line pattern representations (act 501 in FIG. 5), each representing a line pattern having a changing value in the first dimension as a function of a value in a second dimension. The line pattern representation may be generated based on underlying data accessible (either locally or remotely) to the pattern generation component 401. Examples of line patterns include, for example, time series charts, log series data, usage charts, activity charts, and so forth. As very specific examples, such charts might allow a user to quickly evaluate any type of information such as example call patterns, data center operations, social media response (e.g., number of tweets) regarding a particular actor before and after an academy award event, and so forth.

In FIG. 4, the pattern generation component 401 generates (as represented by arrow 421) a set 411 of line pattern representations represented symbolically as A through J in FIG. 4. This set 411 represents an example of at least a portion of the collection 210 of FIG. 2. Although 10 line pattern representations A though J are illustrated in FIG. 4, the ellipses K symbolically represents that there is no limit to the number of line pattern representations generated by the pattern generation component 401 to form the collection. There may be up to thousands or even millions or more of line pattern representations. As previously mentioned, one of the advantages of embodiments described herein is the ability to encode and quickly search large numbers of line pattern representations in a relatively short period of time to enable more real time searching based on input gestures.

Figure 6:
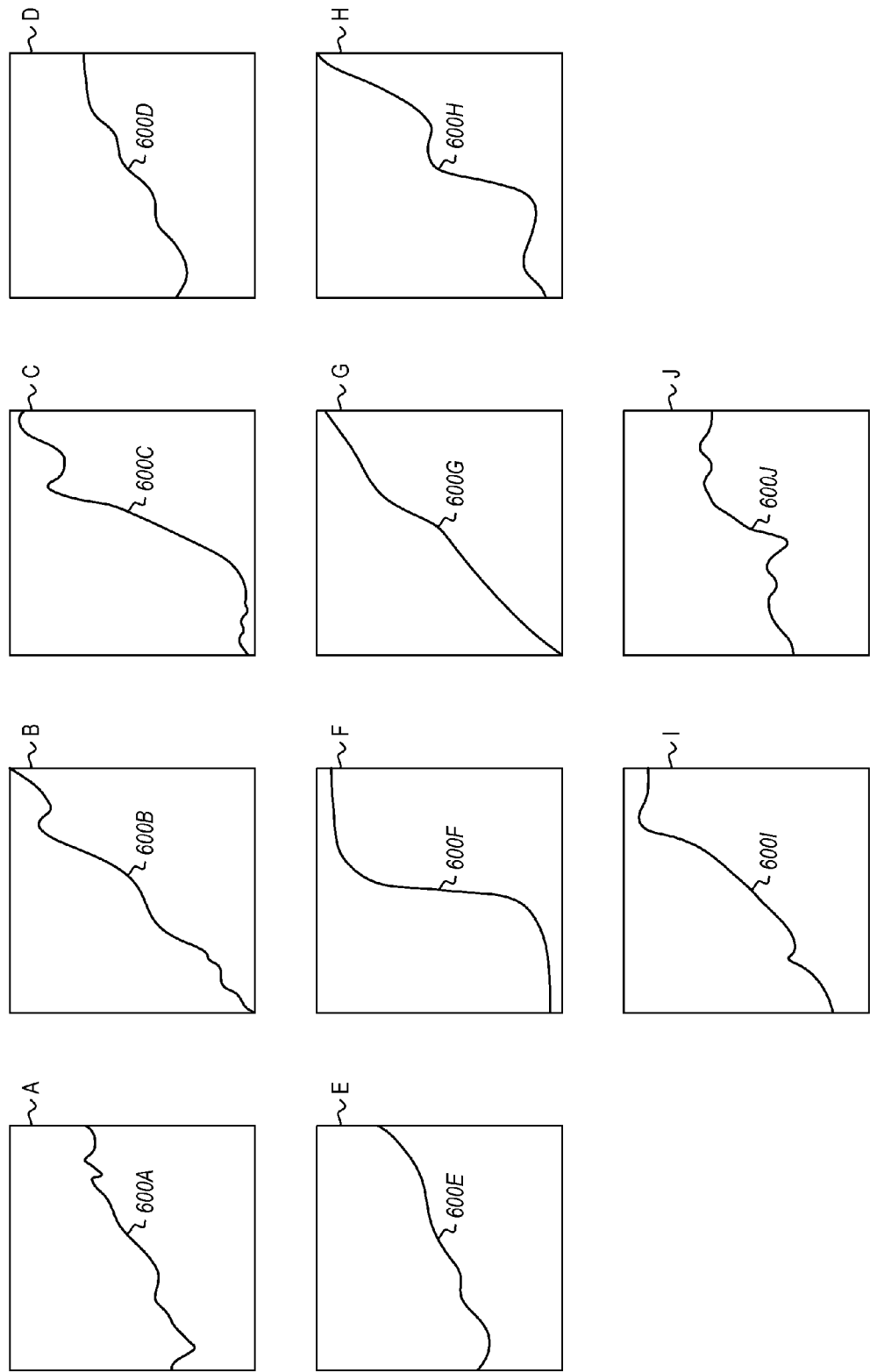
FIG. 6 illustrates a number of example line pattern representations used as a specific example of how the principles described herein may be employed.

FIG. 6 illustrates example line pattern representations A through J in further detail including corresponding represented line pattern 600A through 600J. These line pattern representations will be referred to as a single example, although the principles described herein are applicable to any set of line pattern representations regardless of the line patterns themselves, and regardless of the number of line pattern representations. Nevertheless, the example line pattern representations A though J of FIG. 6 will be a helpful and specific study that will illuminate the more general principles that are not limited to this example. In the case of FIG. 6, the first dimension (along which the line pattern value varies) is the vertical dimension often referred to as the "y axis", whereas the second dimension (representing the input value) is the horizontal axis often referred to as the "x axis".

Figure 7:
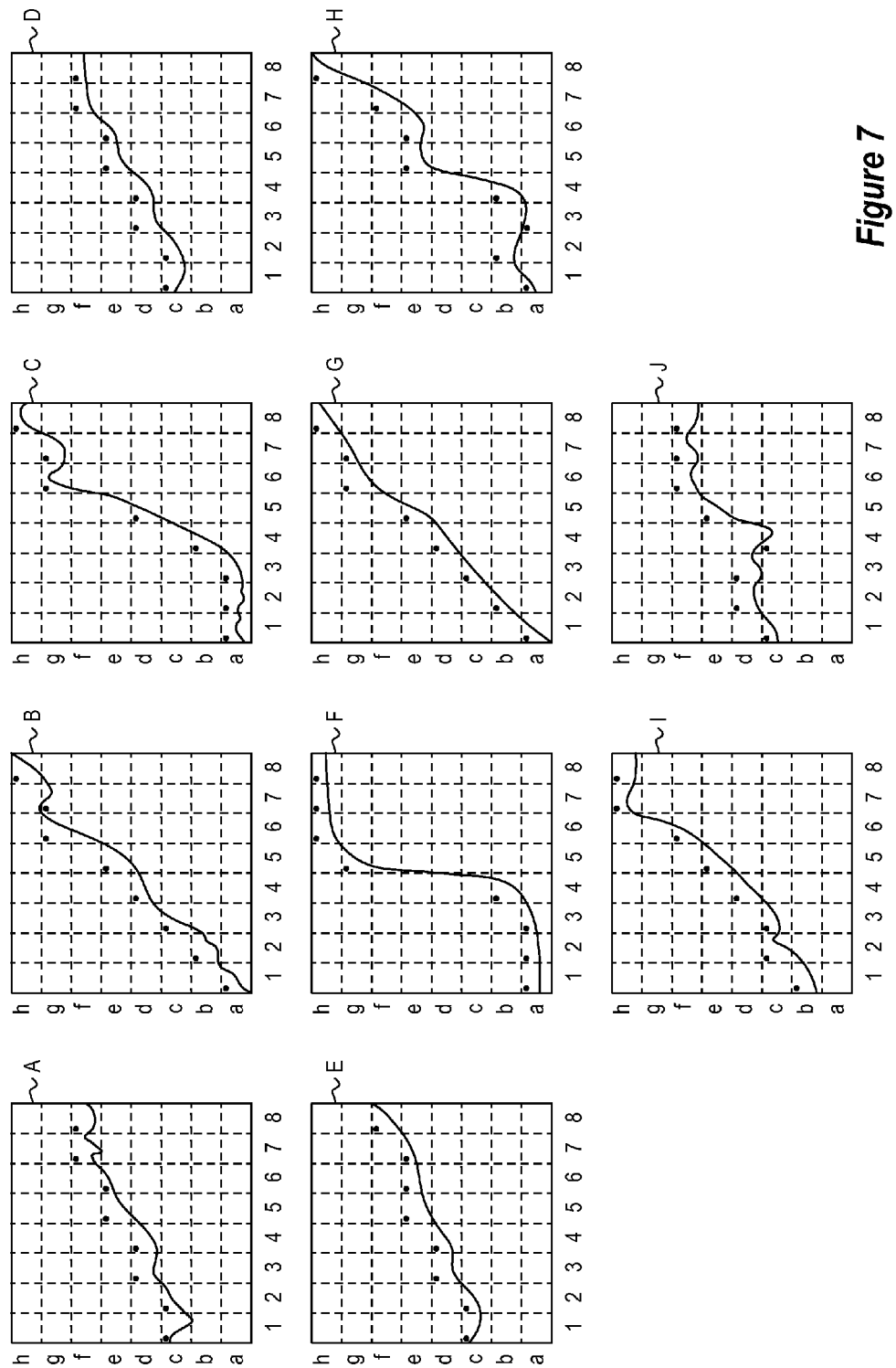
FIG. 7 illustrates the line pattern representations of FIG. 6 segmented into eight segments and ranged into eight ranges.

Referring again to FIG. 4, the segmentation component 402 accesses the line pattern representations (as represented by arrow 422) in FIG. 4, and segments each the line pattern representation into multiple segments along the second dimension (reference act 502 of FIG. 5). The segmentation component 402 also may divide the first dimension of each line pattern representation into multiple ranges (reference act 503 of FIG. 5). For instance, FIG. 7 illustrates the same line pattern representations A though J of FIG. 6, except that the line pattern representations are shown as segmented and ranged. In the case of FIG. 7, there are eight segments 1 through 6 and eight ranges "a" through "h", although the granularity of the segmentation may be selected otherwise.

The encoding component 403 access the segmented and ranged line pattern representation (as represented by arrow 423) in FIG. 4, and assigns a quantized value to each of the segments for each of the line pattern representations based on the changing value in the first dimension as present within the corresponding segment (reference act 504 of FIG. 5). For instance, in FIG. 7, the line pattern of line pattern representation A has a value that generally falls in range "c" within segment 1, in range "c" within segment 2, in range "d" within segment 3, in range "d" within segment 4, in range "e" within segment 5, in range "e" within segment 6, in range "f" within segment 7, and in range "f" within segment 8. Accordingly, the line pattern representation might be encoded with the sequence "ccddeeff", labeling the applicable ranges from left to right as the line pattern moves through the segments 1 through 8 in order.

The assignment of the range within which the line pattern falls for a given segment may be a relatively straightforward calculation in order to allow the matching process of act 202 to be efficient so that even large data sets may be quickly processed for matching. As an example, the mean of the line pattern within the corresponding segment may be calculated, and the identifier for the range within which that mean falls will be assigned for that segment. However, the principles described herein are not limited to how the range identifier for any given segment is identified.

As for the line pattern of line pattern representation B in FIG. 7, the mean of the line pattern falls in range "a" within segment 1, in range "b" within segment 2, in range "c" within segment 3, in range "d" within segment 4, in range "e" within segment 5, in range "g" within segment 6, in range "g" within segment 7, and in range "h" within segment 8. Accordingly, the line pattern representation might be encoded with the sequence "abcdeggh", labeling the applicable ranges from left to right as the line pattern moves through the segments 1 through 8 in order. For reader reference, a dot is placed in the upper left corner of the applicable range for each segment of each line pattern representation A through J shown in FIG. 7. This may continue for all line pattern representations A through J of FIG. 7 to encode the line patterns as shown in the following Table 1:

TABLE 1

| Line Pattern Representation Identifier | Encoded Representation |
|---|---|
| A | ccddeeff |
| B | abcdeggh |
| C | aaabdggh |
| D | ccddeeff |
| E | ccddeeef |
| F | aaabghhh |
| G | abcdeggh |
| H | ababeefh |
| I | bccdefhh |
| J | cddcefff |

The encoded representation of the line pattern representations may then be saved (as represented by arrow 424) to the collection so that they may be matched against input gestures by the user.

In the case of a literal gesture, the line pattern input by the user is matched against the line pattern representations in the collection. In that case, the input line pattern may be subjected to the same encoding process described with respect to FIG. 5. Then the encoded representation of the input line pattern may be compared against the encoded representations of each of the line pattern representations in the collection. If the encoded representations match, then they are considered a match. If there is one segment that differs by one range, then perhaps that is not as close of a match, but still might warrant visualizing, although perhaps in a less visually emphasized way than the exact matches based on the encoded values.

In the case of a semantic gesture, the semantic gesture need only be recognized once. Accordingly, efficient searching based on semantic gestures may be performed even if the algorithm for identifying the semantic gesture is more complex. Once the search parameters are identified based on the semantic gesture, the search may be reduced at that point to a reference to the encoded values.

For instance, suppose that the semantic gesture indicates that a line pattern with a slight positive slope is being searched for. This can be translated into an appropriated encoded search. As an example, the encoded representations may be searched for all line patterns whose encoded representation satisfies the following:
1) ranges do not decrease proceeding from segment 1 to 8.
2) range may increase by one if the previous 2 to 4 segments have had the same range.

Likewise, as an example, a search for a volatile line representation may be reduced to the following encoded representation search:
1) no segment should have the same range as a neighboring segment (with only one exception permitted).

Accordingly, the principles described herein provide an effective mechanism for receiving a user gesture and perform a matching or searching operation of the collection of line pattern representations based on the gesture.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for searching a line pattern representation amongst a collection of line pattern representations, the method performed by executing computer executable instructions on one or more processors of the computer, the method comprising:
   detecting an input gesture input by a user into a computing system;
   encoding the input gesture by segmenting a line pattern associated with the input gesture into a plurality of segments and assigning a quantized value to each segment of the line pattern;
   automatically matching the input gesture against each of a plurality of line pattern representations,
      each representation representing a line pattern having a changing value in a first dimension as a function of a value in a second dimension, and each representation having an encoding comprising a plurality of quantized values associated with a plurality of segments of the each line pattern, and
      automatically matching comprising determining a measure of commonality between the encoding of the input gesture and the encoding of each of the plurality of line pattern representations; and
   visualizing at least one line pattern representation of the matched set on a display of the computing system.

2. The method in accordance with claim 1, wherein the input gesture is an input line pattern, wherein automatically matching the input gesture comprises automatically searching one or more line pattern representations that have line patterns that most closely match the input line pattern.

3. The method in accordance with claim 1, wherein the input gesture has semantic meaning regarding search parameters.

4. The method in accordance with claim 3, wherein the search parameters correlate to a rate of change of a line pattern to search for.

5. The method in accordance with claim 3, wherein the search parameters correlate to a direction of change of a line pattern to search for.

6. The method in accordance with claim 3, wherein the search parameters correlate to a volatility of a line pattern to search for.

7. The method in accordance with claim 3, wherein the search parameters correlate to a location of a peak of a line pattern to search for.

8. The method in accordance with claim 3, wherein the search parameters correlate to a location of a bottom of a line pattern to search for.

9. The method in accordance with claim 3, wherein the search parameters correlate to a relationship between an input line pattern and a line pattern to search for.

10. The method in accordance with claim 9, wherein the relationship is a cross-over between the input line pattern and the pattern to search against.

11. The method in accordance with claim 3, wherein the search parameters correlate to a general shape of a line pattern to search for.

12. The method in accordance with claim 1, further comprising:
displaying the matched set in a manner that a display parameter conveys closeness of the match with the input gesture.

13. The method in accordance with claim 12, wherein the display parameter comprises a position.

14. The method in accordance with claim 12, wherein the display parameter comprises a darkness.

15. The method in accordance with claim 12, wherein the display parameter comprises a size.

16. A computer program product comprising one or more computer-readable storage devices having thereon computer-executable instructions that are structured such that, when executed by one or more processors of a computing system, cause the computing system to perform a method for searching a line pattern representation amongst a collection of line pattern representations, the method comprising:
determining that an input gesture has been input into the computing system;
encoding the input gesture by segmenting a line pattern associated with the input gesture into a plurality of segments and assigning a quantized value to each segment of the line pattern;
automatically matching the input gesture against each of a plurality of line pattern representations,
each representation representing a line pattern having a changing value in a first dimension as a function of a value in a second dimension, and each representation having an encoding comprising a plurality of quantized values associated with a plurality of segments of the each line pattern, and
automatically matching comprising determining a measure of commonality between the encoding of the input gesture and the encoding of each of the plurality of line pattern representations; and
visualizing at least one line pattern representation of the matched set on a display of the computing system.

17. The computer program product in accordance with claim 16, wherein the input gesture is an input line pattern, wherein automatically matching the input gesture comprises automatically searching one or more line pattern representations that have line patterns that most closely match the input line pattern.

18. The computer program product in accordance with claim 16, wherein the input gesture has semantic meaning regarding search parameters.

19. The computer program product in accordance with claim 16, the method further comprising:
displaying the matched set in a manner that a display parameter conveys closeness of the match with the input gesture.

20. A computing system for searching a line pattern representation amongst a collection of line pattern representations, the system comprising:
persistent data storage comprising a collection of line pattern representations;
one or more computer-readable hardware storage devices having thereon computer-executable instructions; and
one or more computer processors upon which executes the computer executable instructions which cause the computing system to instantiate:
an input mechanism that detects user input;
a matching mechanism that matches input gestures input into the input mechanism against each of the collection of line pattern representations to form a matched set, each line pattern representation representing a line pattern having a changing value in a first dimension as a function of a value in a second dimension,
each input gesture being encoded by segmenting a line pattern associated with the input gesture into a plurality of segments and assigning a quantized value to each segment of the line pattern,
each representation in the collection of line pattern representations having an encoding comprising a plurality of quantized values associated with a plurality of segments of the each line pattern, and
matching comprising determining a measure of commonality between the encoding of the input gesture and the encoding of each of the plurality of line pattern representations; and a visualization component for visualizing at least some of the matched set.

* * * * *